1,472,629

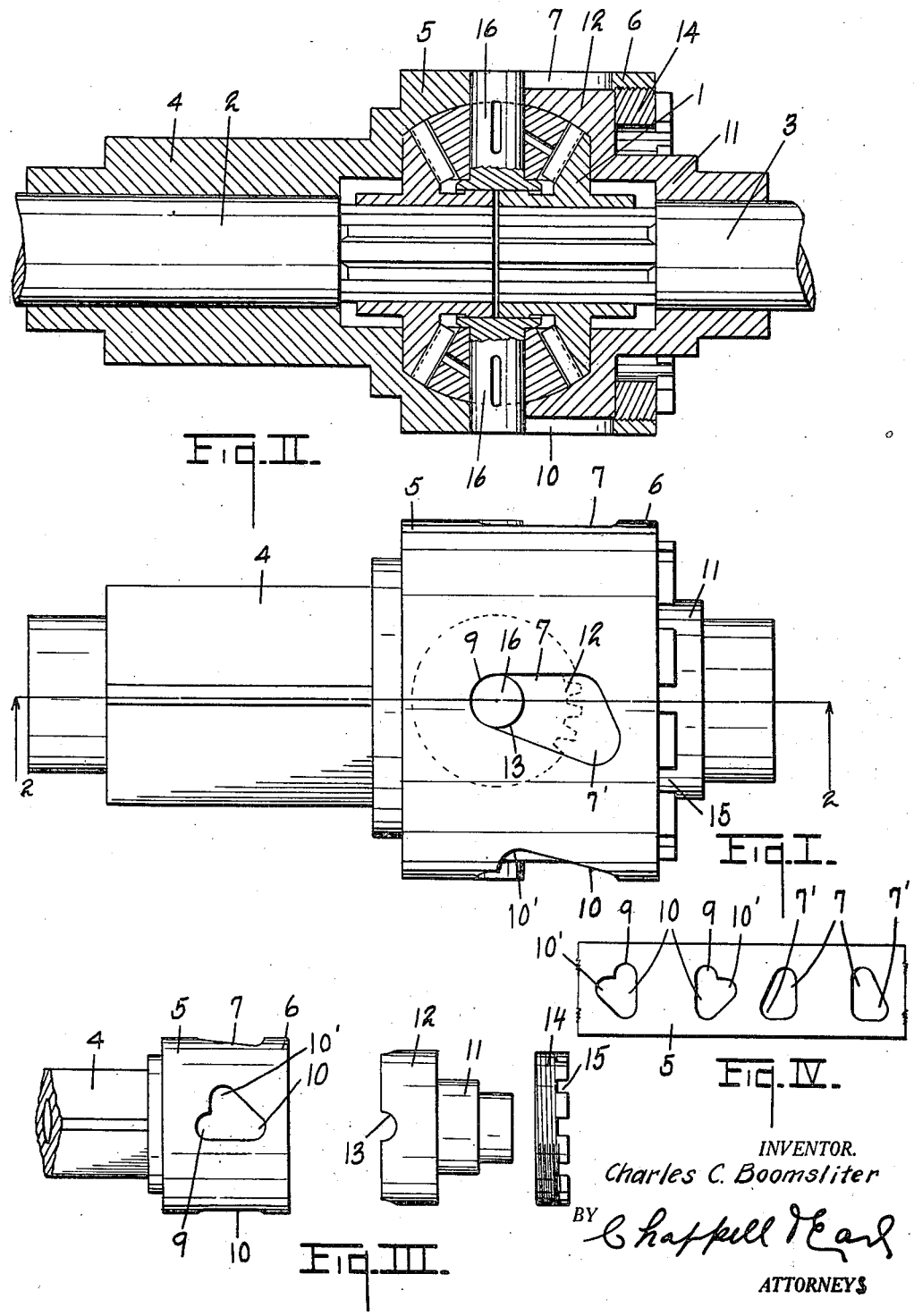
Oct. 30, 1923.
C. C. BOOMSLITER
1,472,629
DIFFERENTIAL GEAR FOR AUTOMOBILES
Filed May 23, 1922
INVENTOR.
Charles C. Boomsliter
ATTORNEYS Patented Oct. 30, 1923.

UNITED STATES PATENT OFFICE.

CHARLES C. BOOMSLITER, OF GRAND RAPIDS, MICHIGAN.

DIFFERENTIAL GEAR FOR AUTOMOBILES.

Application filed May 23, 1922. Serial No. 562,952.

*To all whom it may concern:*

Be it known that I, CHARLES C. BOOMSLITER, a citizen of the United States, residing at Grand Rapids, county of Kent, State of Michigan, have invented certain new and useful Improvements in Differential Gears for Automobiles, of which the following is a specification.

This invention relates to improvements in differential gears for automobiles. It relates more particularly to the gear housing structure thereof.

The object of the invention is to provide a differential gear and housing especially adapted for use in my structure patented May 31, 1921, No. 1,379,675.

A further object is to provide such a structure in which the differential gear housing is effectively retained in position without the use of bolts or screws so commonly and extensively employed at the present time, and at the same time to produce what might be regarded essentially as a strong unitary structure.

Objects pertaining to details and economies of construction and operation will definitely appear from the detailed description to follow.

I accomplish the objects of my invention by the devices and means described in the following specification. The invention is clearly defined and pointed out in the claims.

A structure which is a preferred embodiment of the invention is clearly illustrated in the accompanying drawing forming a part of this specification, in which:

Fig. I is an elevation view of a differential gear and housing embodying the features of my invention, one of the gears being indicated by dotted lines.

Fig II is an inverted sectional plan view taken on line 2—2 of Fig. I looking upward in the direction of the little arrows at the ends of the section line, portions appearing in full lines.

Fig. III is a detail view of the housing members in exploded relation, the differential gearing itself being omitted.

Fig. IV is a development of the inner surface of the outer shell showing the form of the longitudinal slots.

In the drawing similar numerals of reference refer to similar parts throughout the several views.

The parts of the drawing will be considered by their numbers. 1 is a differential gearing of the usual standard and well-known form, which will not need description as to details. 2 and 3 are the rear axle shafts fitted into and engaging the gear in a usual and well-known manner. 4 is the main differential sleeve which is expanded into a head 5 to receive and carry the driven gears and other parts that may be disposed in accordance with my invention above referred to. This is expanded into a cylindrical shell 6 containing longitudinal slots 7, 7 and 10, 10 at each quarter. The elongated slots 7 have symmetrical divergently expanded portions 7' at the outer end and terminate in the half-round part 9 to receive two adjacent projecting pins 16 of the differential. The opposed parts of the elongated slots 10 are looped and expanded at 10' at their inner ends for receiving the end of the opposed projecting pins 16 of the differential, in a manner hereinafter to be explained.

11 is the differential hub which is extended into a cylindrical housing 12 adapted to fit within the cylindrical shell 6, the same being suitably notched at 13 with semi-circular notches to receive the projecting ends 16 of the differential gear pins. After the differential gear is inserted in the main housing 5, this housing member 12 is inserted within the shell 6 and is retained in place by the screw threaded ring 14 which is notched like a castellated nut at 15 for the purpose of inserting the same. The flat inner side of the ring engages suitable bearing surface at the outer end of the housing member 12.

Owing to the fact that the differential gear is substantially cylindrical, it is found possible to quite readily insert the pins 16 into the housing, owing to the peculiar shape of the elongated adjacent slots 7, 7 and 10, 10. The pins 16 are first manipulated and inserted into the slot 10 and the adjacent cross pins 16 brought into the depression 10,' where it is possible to rock the differential gearing until the opposed pins enter the opposed slots 7 at 7,' when the differential can be swung to position, when the pins are presently located in the semi-circular inner ends 9 of the slots 7 and 10. The housing member 12 is then inserted and the ring 14 screwed home, thus providing a bearing and grip for the ends of the differential pins 16.

I have described my improved housing in its preferred form. It can, of course, be considerably varied in its details without departing from my invention.

By lessening the length of the pins 16 or increasing the diameter of the housing slightly, of course the particular form of slots I have provided can be dispensed with, but they are very clearly of great advantage in reducing the thickness of the wall and producing a compact structure, and thus reducing unsprung weight in the rear axle.

It will be seen also that the differential housing is entirely encased and completely protected in its position to retain the lubricant. The structure can be made very compact, as the metal is not weakened by numerous bolt holes and the full strength of the metal is had, which is of considerable advantage over the structure with numerous bolts that are usually provided for the purpose.

I desire to claim the invention in the specific form illustrated and also to claim the same broadly as pointed out in the appended claims.

Having thus described my invention, what I claim as new and desire to secure by Letters Patent is:

1. The combination with a differential gearing and the driving axles therefor, of a differential sleeve enlarged into a cylindrical shell or housing with seats for carrying the parts, the shell being internally screw-threaded at its outer end and the said housing being slotted at each quarter longitudinally with elongated slots, one adjacent pair having symmetrical laterally-extended loop portions at the outer ends and the opposed adjacent pair having their inner ends expanded, to accommodate the assembling of the differential gearing therein, a differential hub expanded and terminated in a cylindrical housing member adapted to fit within the shell of the main housing member, and a screw ring suitably castellated engaging the threads within the shell for clamping the said housing members together, all coacting substantially as described for the purpose specified.

2. The combination with a differential gearing and the driving axles therefor, of a differential sleeve enlarged into a cylindrical shell or housing with seats for carrying the parts, the shell being internally screw-threaded at its outer end, a differential hub expanded and terminated in a cylindrical housing member adapted to fit within the shell of the main housing member, and a screw ring suitably castellated engaging the threads within the shell for clamping the said housing members together, all coacting substantially as described for the purpose specified.

3. The combination with a differential gearing and the driving axles therefor, of a differential sleeve enlarged into a cylindrical shell or housing with seats for carrying the parts, the said housing being slotted longitudinally at each quarter with elongated slots, one adjacent pair having symmetrical laterally-extended loop portions at the outer ends and the opposed adjacent pair having their inner ends expanded, to accommodate the assembling of the differential gearing therein, a differential hub expanded and terminated in a cylindrical housing member adapted to fit within the shell of the main housing member, and means to retain said members together, all coacting substantially as described for the purpose specified.

4. The combination with a differential gearing and the driving axles therefor, of a differential sleeve enlarged into a cylindrical shell or housing with seats for carrying the parts, a differential hub expanded and terminated in a cylindrical housing member, adapted to fit within the shell of the main housing member, and means to retain said members together, all coacting substantially as described for the purpose specified.

In witness whereof I have hereunto set my hand and seal.

CHARLES C. BOOMSLITER. [L. S.]